United States Patent [19]

Stackpole

[11] 4,384,317
[45] May 17, 1983

[54] SOLAR POWERED LIGHTING SYSTEM

[75] Inventor: Edward J. Stackpole, San Antonio, Tex.

[73] Assignee: John R. Hart, San Antonio, Tex.

[21] Appl. No.: 90,322

[22] Filed: Nov. 1, 1979

[51] Int. Cl.³ .............................................. F21L 7/00
[52] U.S. Cl. .................................... 362/183; 362/184;
362/234; 362/249; 362/276; 362/295; 362/800;
362/802; 362/812
[58] Field of Search ............... 362/183, 184, 234, 249,
362/276, 295, 800, 802, 812

[56] References Cited

U.S. PATENT DOCUMENTS 4,009,535  3/1977  Stock .................................... 362/183
4,200,904  4/1980  Doan .................................... 362/183
4,281,369  7/1981  Batte .................................... 362/183

Primary Examiner—Stephen J. Lechert, Jr.
Attorney, Agent, or Firm—Gale R. Peterson

[57] ABSTRACT

A solar powered lighting system including a light emitting unit electrically connected to a rechargeable power storage unit, a solar powered recharger connected to that power storage unit, means to prevent discharge of that power storage unit through the solar powered recharger, means to prevent overcharging of the power storage unit, means to prevent discharging the power storage unit below a predetermined level and means to automatically connect the disconnect the light emitting unit from the power storage unit wherein the voltage output of the solar powered recharger and the power storage unit is matched to the voltage required by the light emitting unit.

8 Claims, 9 Drawing Figures

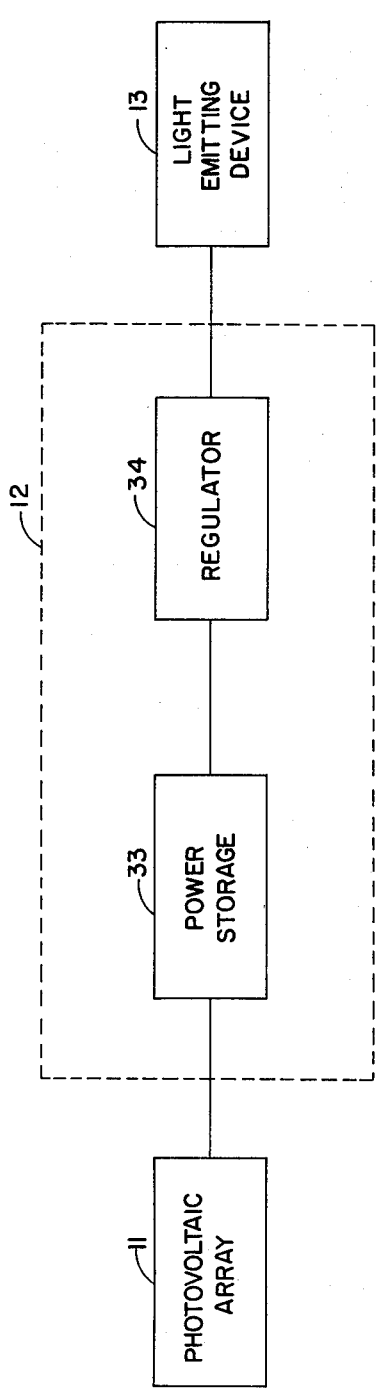
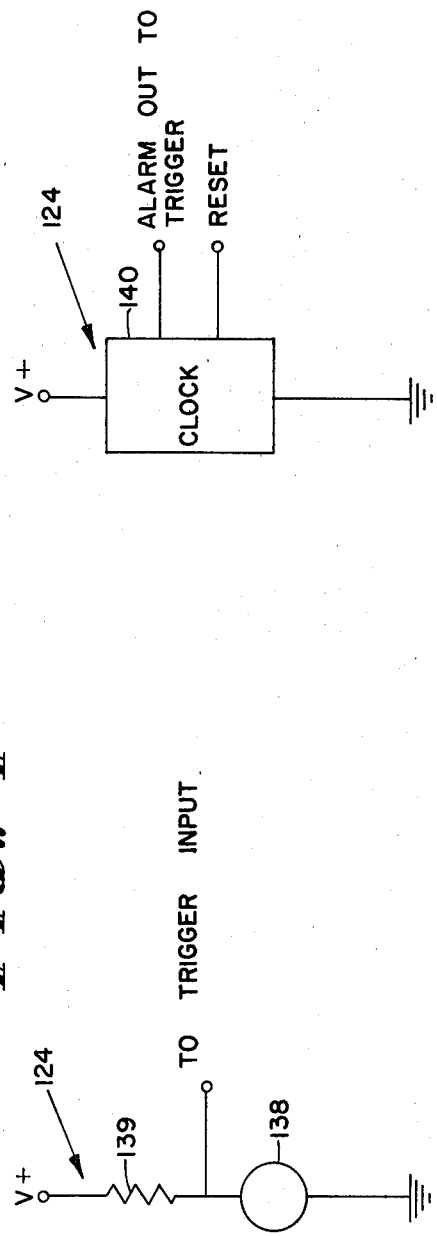
FIG. 4
FIG. 8
FIG. 9

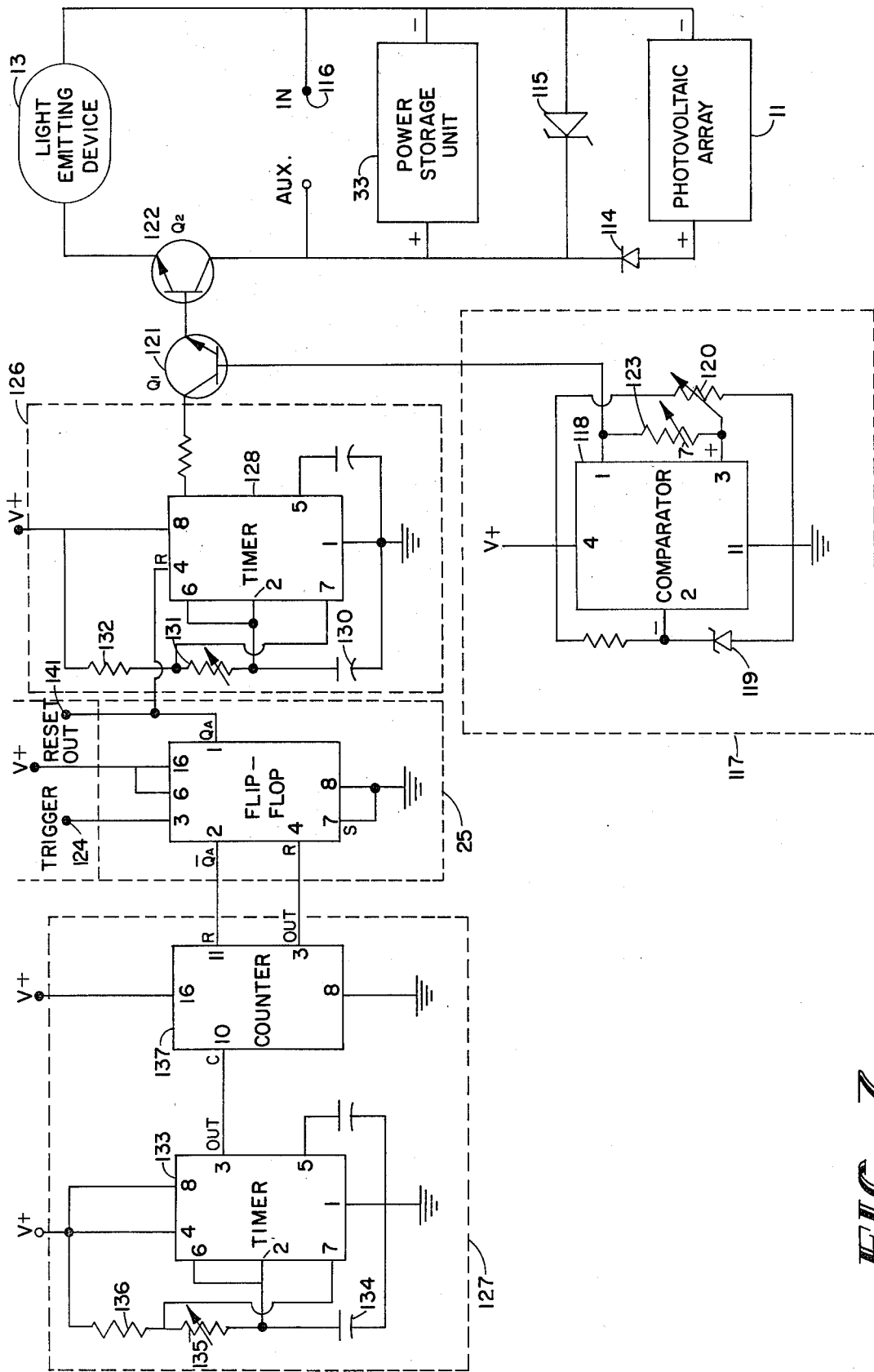

SOLAR POWERED LIGHTING SYSTEM

BACKGROUND OF THE INVENTION

The solar powered lighting system of the present invention is particularly suitable for outdoor advertising signs, however, the system may be used in any lighting environment. Because the primary application of the herein described invention is for powering outdoor advertising signs, however, the invention will be described in conjunction therewith for explanatory purposes only. The power source used in the present invention is described in pending U.S. Application Ser. No. 80,405, filed Oct. 1, 1979, for Solar Power Supply by William E. Rogers.

Illuminated outdoor advertising signs have traditionally been powered by connection to the local electrical utility service. That involves, of course, hiring an electrician to make the appropriate electrical connections to such signs and also involves the recurring monthly charge for electricity used. It is desirable for both environmental and economic reasons to use an alternative to commercially produced electricity. Solar power offers such alternative.

Previous attempts at solar powered signs, however, have involved taking the low voltage output of photovoltaic panels and converting that low voltage to a higher voltage in order to power conventional illumination sources. In particular, prior experiments involved attempting to convert the direct current output of photovoltaic panels to alternating current of sufficient mangnitude to power conventional mercury vapor, neon or other types of lighting systems. Such attempts have generally failed because the voltage conversion involves energy loss and concomittant inefficiency. The herein described invention solves that problem by using a lighting system capable of being operated at the same direct current low voltage generated by conventional photovoltaic panels. For example, a sign illuminated with light emitting diodes requires the same low voltage generated by conventional photovoltaic panels. That type of system is inherently more efficient because voltage conversion is not required.

The present invention uses a solar power source designed to operate such a low voltage sign. Because the solar power source is entirely self-contained, no connection to a local electrical utility service is necessary and of course no commercially produced electricity need be used.

SUMMARY OF THE INVENTION

The solar powered lighting system of the present invention is a combination of a low voltage light emitting device (e.g. a bank of light emitting diodes), a photovoltaic battery charger, a power storage device, and an electronic control to operate that low voltage light emitting device.

The low-voltage light emitting device is preferably a plurality of photo-emitting semiconductors (e.g. light-emitting diodes) connected in series such that a single bank of serially connected photo-emitting semiconductors approximately equals the voltage output of a conventional photovoltaic array.

The battery charger consists of a photovoltaic array capable of producing electricity from sunlight connected to a power storage device. A blocking device in series with that panel prevents the power storage device from discharging through the photovoltaic array during periods when that array is not producing electricity, e.g. on cloudy days or at night. Provision is also made to prevent the power storage device from overcharging.

In the case of advertising signs, a control is necessary to turn the sign on and off at appropriate times. That is the function of the electronic control. That control, of course, may be used to turn whatever light-emitting device is being powered on and off. The control for turning the device on may consist of either an electronic clock set to the desired "on time" or a photoresistor operable to turn the device on and off when ambient light reaches predetermined levels. In the case of an illuminated outdoor sign, the clock may be set to the prevailing sundown time or the photoresistor may operate to turn the sign on at dusk.

The electronic control also operates to turn the sign off at an appropriate time through use of a timer actuated when the device is turned on. Once the timing period has expired, the device is turned off. The timing period, of course, is set for the desired length of operation.

The control of the present invention also includes an additional timer circuit for, in the case of powering a sign, flashing operation. Such flashing attracts attention to the sign and also conserves energy by leaving the sign on for only a fraction of the total operating time. If the sign were to be left on continuously, a larger power supply would be needed for the same duration of operation.

Therefore, although the primary object of the invention is to provide a solar powered lighting system for an illuminated outdoor sign, other objects, features, and advantages of the invention will become evident in light of the following detailed description, in conjunction with the referenced drawings, of a preferred exemplary system according to the invention.

DESCRIPTION OF THE DRAWINGS

FIG. 4 is a block diagram of the solar powered lighting system of the present invention.

FIG. 7 is a detailed schematic of the power supply used by the present invention.

FIG. 8 is a schematic of the electronic control used by the present invention and using a photo resistor.

FIG. 9 is a schematic of the electronic control used by the present invention and using a digital clock.

DETAILED DESCRIPTION OF THE INVENTION

Figure 1:
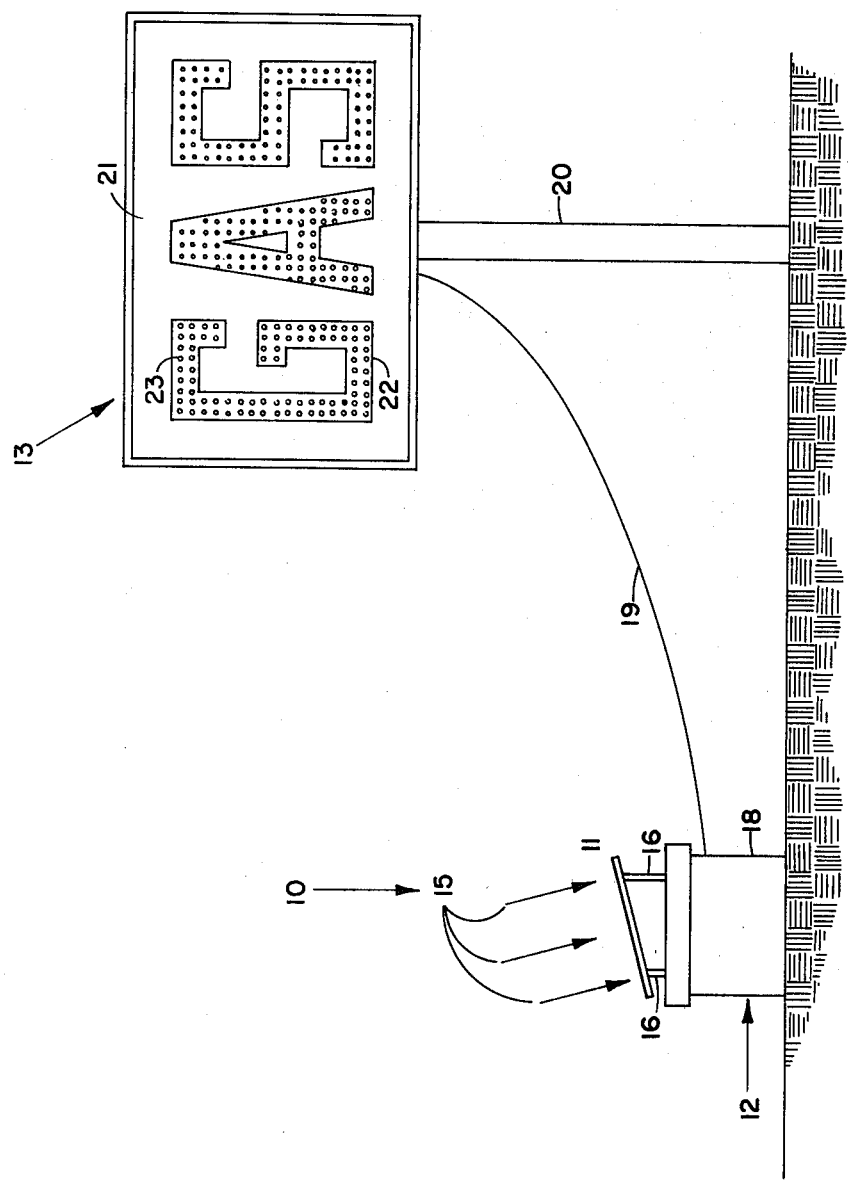
FIG. 1 is an environmental illustration of the present invention.

The solar powered lighting system 10 of the present invention, as shown in FIG. 1, broadly consists of a photovoltaic array 11, a power storage and regulator unit 12 (power supply) electrically connected to a light emitting device 13, for example, an outdoor advertising sign.

Figure 5:
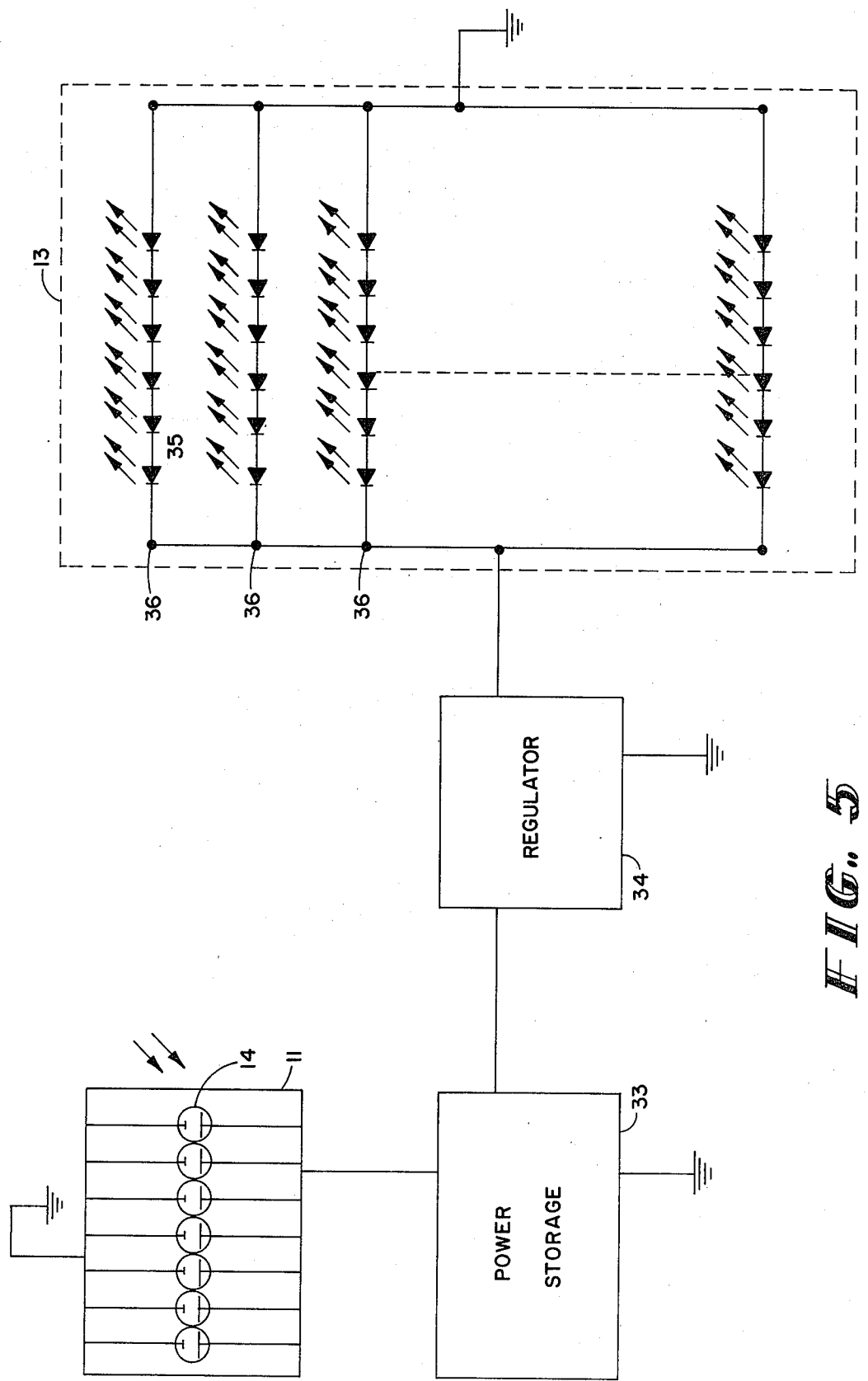
FIG. 5 is a schematic of the solar powered lighting system of the present invention.

Photovoltaic array 11 is of conventional design and typically consists of a plurality of photovoltaic cells 14, as shown in FIG. 5, which generate a potential upon absorption of radient energy 15. The arrangement and connection of photovoltaic cells 14 as shown in FIG. 5 is for illustrative purposes only. Those cells may be arranged and connected as desired to obtain whatever potential is necessary for operating the lighting system of the present invention. Typically, however, such photovoltaic arrays 11 have a sufficient number of photovoltaic cells 14 so connected as to provide approximately 12 volts D.C. output.

As shown in FIG. 1, photovoltaic array 11 may be conveniently mounted on brackets 16 and 16' secured to a cover 17 atop power source container 18. Container 18 is suitably sized to accomodate the hereinafter described power storage unit and power regulator. The container may be made of any suitable material, for example, light metal or plastic. Cover 17 is suitably sized and constructed to seal container 18 against the environment. Brackets 16 and 16' are so constructed as to dispose photovoltaic array 11 at the optimum angle to receive maximum radient energy, i.e. sunlight.

Photovoltaic array 11 need not be disposed in close juxtaposition to the power storage and regulator unit as shown in FIG. 1, but may be separated therefrom. For example, photovoltaic array 11 may be mounted atop light emiting device 13, atop an adjacent building or other structure, or wherever suitable to obtain maximum exposure to radient sunlight. In the case of an outdoor advertising sign, however, the self-contained unit illustrated in FIG. 1 provides a convenient, highly mobile package, compact in design allowing easy setup and maintenance.

The power storage unit and regulator are electrically connected to light emitting device 13 through a suitable electrical cable 19. In the case of an outdoor advertising sign, as illustrated in FIG. 1, light emitting device 13 is mounted atop a pole 20.

As illustrated in FIG. 1, light emitting device 13 consists of a billboard portion 21 supporting illuminated letters 22. Letters 22 are illuminated by a plurality of photo-emitting devices 23. The number and placement of photo-emitting devices 23 forming letters 22 is determined by the amount of illumination desired and the size of letters 22. Photo-emitting devices 23 may be mounted directly on billboard 21 in such arrays as to form the desired letters 22. Such mounting, however, allows the illumination generated by photo-emitting devices 23 to scatter or spread out across the surface of billboard 21.

Figure 2:
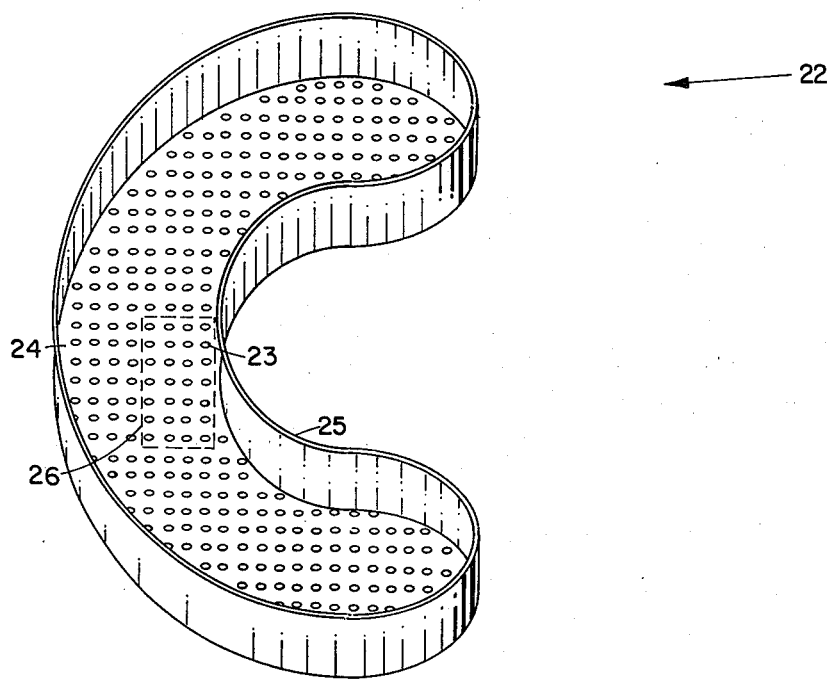
FIG. 2 illustrates an advertising sign letter in accordance with the present invention.

Therefore, as illustrated in FIG. 2, it is preferable to form letters 22 of a base portion 24 in the shape of the desired letter, such base having an upwardly extending portion 25 about the periphery of base 24 making a letter of U-shaped cross-section. Although base 24 and upwardly extending portion 25 are illustrated as being generally flat, base 24 may be concave and mate with portion 25 so as to form a letter of general U-shaped cross-section having a concave surface. Photo-emitting devices 23 are disposed and mounted on base 24 as shown in FIG. 2. Base 24 and upwardly extending portions 25 making letters 22 may be formed of any suitable material, for example, any light metal or plastic material. Indeed, the entire letter 22 may be formed of molded plastic or the like.

Figure 3:
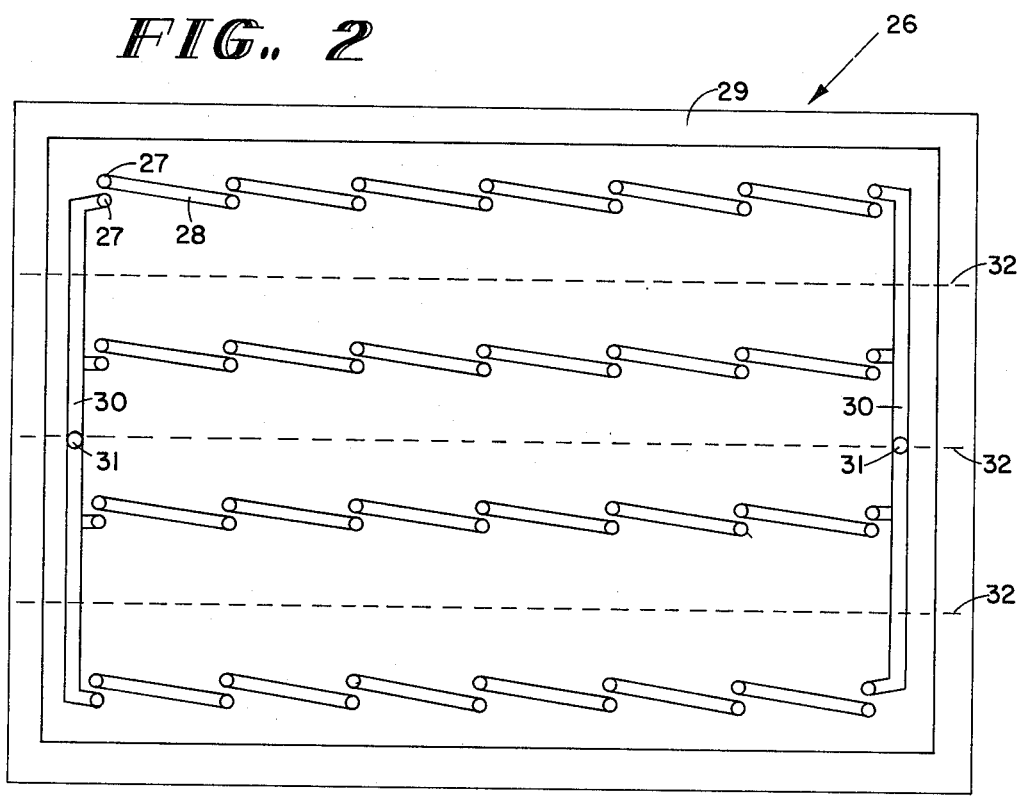
FIG. 3 illustrates a printed circuit board for holding photoemitting devices in accordance with the present invention.

Photo-emitting devices 23 may be mounted directly on base 24 or may be mounted on a light-panel 26 as shown on FIG. 3 and in phantom lines in FIG. 2. Photo-emitting devices such as light-emitting diodes (LED's) typically have an operating voltage of 1.5 to 2 volts. As aforesaid, photovoltaic array 11 typically outputs approximately 12 volts D.C into power source 12. Power source 12 similarly outputs approximately 12 volts D.C. Therefore, if 1.5 to 2 volt LED's are used as the photo-emitting devices 23, it is necessary to arrange those LEDs in banks of six serially connected LEDs in order that each bank will operate off the 12 volt supply. Light panel 26 illustrates such an arrangement. A printed circuit board 29 has a plurality of through holes 27 and 27' formed therein as illustrated. Electrically conductive paths 28 serially connect six pairs of through holes 27 and 27'. As illustrated, four of those six banks are connected in parallel by virtue of electrically conductive paths 30 and 30'. The two leads from an LED or other photo-emitting device are extended through holes 27 and 27' and soldered or otherwise electrically connected to conductive paths 28 and mechanically connected to printed circuit board 29. Electrical connection to the four parallel banks is made through holes 31 and 31' through which connecting wires may be soldered or otherwise attached to conductive paths 30 and 30'. Although photo-emitting devices 23 maybe serially connected in banks by means other than the printed circuit board of FIG. 3, for example, by standard wire and socket connections similar to conventional Christmas tree lights, the printed circuit board connections of FIG. 3 offer the advantage of being able to be broken along dotted lines 32, 32' and 32''. In attaching such printed circuit boards to the base 24 of letters formed as in FIG. 2, portions of that base may not accomodate a full light-panel 26. In such instance, light-panel 26 may simply be scored with a knife or other means along any of the lines 32, 32' or 32'' and the circuit board broken to retain one, two or three banks of six photo-emitting devices.

Photo-emitting devices other than LEDs may require more or less than six photo-emitting devices in a bank depending upon the voltage requirements of the device used. Also, if the solar power supply consisting of the photovoltaic array 11 and the power storage and regulator unit were operated at a voltage other than 12 volts, appropriate changes in the type or number of photo-emitting devices used could be made. In other words, the output of power storage and regulator unit 12 should be the same as the voltage drop across a bank consisting of one or more photo-emitting devices 23.

Thus, broadly, the invention consists of, as shown in FIG. 4, a photovoltaic array 11 connected to power storage unit 33, power regulator 34 and a light emitting device 13 all operating on approximately the same voltage.

As illustrated more specifically in FIG. 5, photovoltaic array 11 consists of photoconductive cells 14 of a type and manner such that an output voltage is generated of sufficient magnitude to match with the power requirements of power storage device 33 and light emitting device 13. Numerous photoconductive arrays 11 outputting 12 volts D.C. are currently on the market. Therefore, if such array is used, power storage unit 33 should also be a 12 volt D.C. device, for example a conventional lead-acid cell automobile battery. If conventional LED's 35 are used as the photo-emitting devices making up light emitting unit 13, there will be approximately 1.5 to 2 volts dropped across each LED 35. Therefore, six LED's 35 should be serially connected in each bank 36, 36' and 36" with the banks connected in parallel as shown in FIG. 5. Any number of banks 36, 36' and 36" may be used; the number is limited only by the current producing limitations of power storage device 33.

Figure 6:
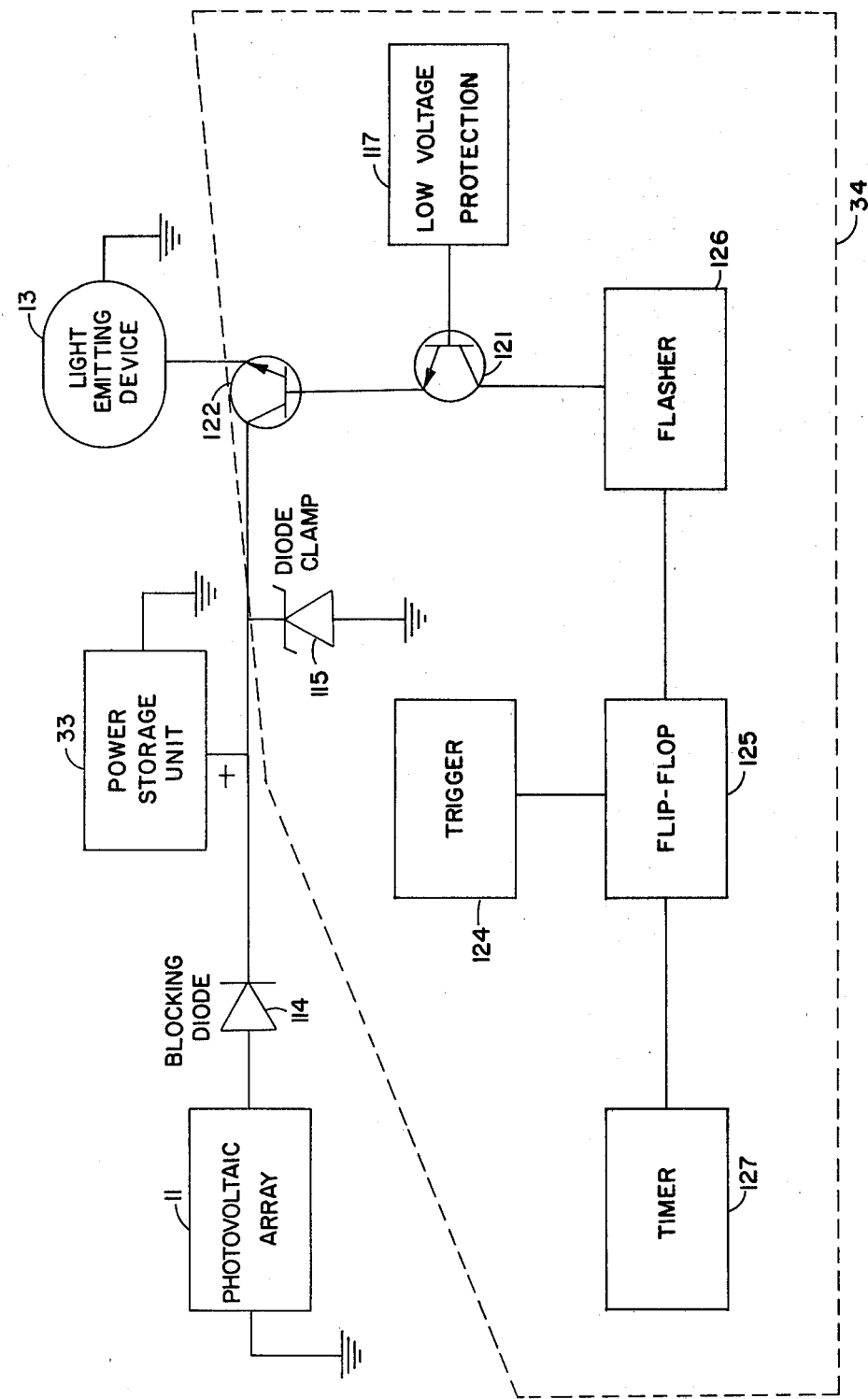
FIG. 6 is a block diagram of the power supply used by the present invention.

Referring to FIG. 6, the power supply used in the present invention consists of a rechargeable D.C. power storage unit 33, for example a conventional 12-volt automobile lead-acid cell battery connected to directly power a low voltage light emitting device 13, for example a sign illuminated by banks of six 1.5-volt to 2-volt LED's connected in series. In the case of illuminated signs and similar loads, it would be impractical to constantly replace power storage unit 33 once discharged. Therefore, for practical reasons, power storage unit 33 is rechargeable.

The power supply used in the present invention uses a photovoltaic array 11 of conventional design for recharging D.C. power storage unit 33. For example, if D.C. power storage unit 33 consists of a conventional automobile lead-acid cell 12-volt battery, photovoltaic array 11 should consist of a sufficient number of photovoltaic cells to generate approximately 12-volts. Such photovoltaic array 11 may be directly connected to rechargeable D.C. power storage unit 33. Under no sun conditions, however, power storage unit 33 would discharge through photovoltaic array 11. To prevent such discharge through photovoltaic array 11, a blocking diode 114 should be placed in circuit between photovoltaic array 11 and power storage unit 33 as shown in FIG. 6 and FIG. 7. At the opposite end of the spectrum, means to prevent power storage unit 33 from overcharging must also be provided. Any suitable circuit means capable of clamping power storage unit 33 at its full potential and operating as a discharge path for photovoltaic array 11 once power storage unit 33 becomes fully charged is suitable. Zener diodes provide such a function. Therefore, a zener diode 115 placed in circuit across power storage unit 33 as shown in FIG. 6 and FIG. 7 would operate to clamp power storage unit 33 at its full potential, but prevent overcharge by providing a discharge path for photovoltaic array 11 once the full potential of power storage unit 33 has been reached. As illustrated in FIG. 7, it is also preferable to provide suitable circuit connections 116 for a conventional battery charger in the event of unusually extended cloudy weather.

As is generally known, if rechargeable D.C. power storage units, e.g. lead-acid cell batteries, are allowed to discharge below a certain level, recharge is rendered difficult and occasionally impossible. Therefore, the solar power supply used in the present invention provides a low voltage protection circuit means 117 for turning off the light emitting device 13 in the event the D.C. potential of power storage unit 33 drops below a predetermined value. That circuit means will maintain the light emitting device 13 in an off condition until the potential of power storage unit 33 has been charged to a predetermined level.

Again, and for purposes of explanation only, if power storage unit 33 consists of a conventional automotive lead-acid cell battery and the light emitting device 13 consists of an outdoor illuminated sign, the circuit of the present invention will turn off the sign if the potential of storage unit 33 drops below 10.5 volts and will maintain the sign in an off condition until power storage unit 33 has been charged up to 12 volts.

As shown in FIG. 7, low voltage protection circuit 117 consists of differential input comparator circuit means 118 having hysteresis. Any such comparator may be used—for example, an LM 324 operational amplifier. Comparator 118 operates to compare the voltage drop across a zener diode 119 with the potential of power storage unit 33. The voltage drop across zenor diode 119 is thus used as a reference voltage. A 10.5 threshold voltage and a 1.5 volt hysteresis loop voltage may be adjusted by variable resistors 120 and 123. Preferably, zener diode 119 is a 6-volt zener diode. Resistor 120 operating as a voltage divider may then be adjusted such that the input at signal position 3 of comparator 118 will be 6-volts when V+ is 10.5-volts. If voltage V+ drops below the threshold voltage, e.g. 10.5-volts, the output of comparator 118 also drops turning off transistor 121. Turning off transistor 121 opens the circuit to the base of transistor 122 thus preventing transistor 122 from conducting, i.e. closing the circuit between power storage unit 33 and light emitting device 13. As long as the output of comparator 118 is held low, transistor 122 will prevent power storage unit 33 from discharging through light emitting device 13. As is apparent, a requirement for comparator 18 is that it have hysteresis in order to maintain transistor 121 conducting until V+ drops below the threshold voltage. The output level of comparator 118 may, of course be adjusted by variable resistor 123. Therefore, if voltage V+ drops below 10.5 volts, transistor 121 will be turned off thus preventing light emitting device 13, e.g. an advertising sign, from operating until power storage unit 33 has been charged to a predetermined level, e.g. 12-volts.

When power storage unit 33 is charged, voltage V+ will rise thus resetting comparator 118.

Low voltage protection circuit 117 only blocks discharge of power storage unit 33 through light emitting device 13. The hereinafter described control circuits use only small amounts of current and will continue to operate despite a low voltage condition.

Power to light emitting device 13 may be automatically supplied by virtue of trigger circuit 124 and bistable multivibrator or flip-flop circuit 125. When an input triggering signal from trigger circuit 124 is received, bistable multivibrator 125 causes transistor 122 to conduct thereby closing the circuit between power storage unit 123 and light emitting device 13. Although multivibrator 125 may be so connected, flashing or intermittant operation of an illuminated sign is often desirable. Therefore, as shown in FIG. 7 output $Q_A$ from circuit 125 is connected to a flasher circuit means 126.

Flasher circuit 126 consists of an astable multivibrator outputting a train of pulses to switch transistor 122 on and off repetitively. Accordingly, power from power storage unit 33 to light emitting device 13 will be intermittantly interrupted. In the case of an advertising sign, the sign will flash. As shown in FIG. 7, the astable multivibrator of flasher circuit 126 consists of a timer circuit, for example an LM 555 operational amplifier timer, having a reset connected to the output of bistable multivibrator 125. Capacitor 130 charges through resistors 131 ad 132 and discharges through resistor 131. Because the duty cycle of the timer depends on the ratio of variable resistor 131 to resistor 132, the flash rate may be set by adjusting variable resistor 131. Flasher circuit 126 will continue to operate so long as signal $Q_A$ from bistable multivibrator 125 remains high.

The advantage of using such a flasher circuit for powering an advertising sign is that the sign need only be on for half the time of operation, thus conserving power stored in power storage unit 33.

After trigger 124 serves to automatically provide power to light emitting device 13 according to the foregoing, it is desirable to provide a timing means for opening the power circuit to light emitting device 13 (i.e. turning transistor 122 off) at the end of a desired period of operation. Therefore, the power supply of the present invention includes a timing circuit means 127. Such timer must be able to time periods of several hours and be adjustable to allow for varying the operating time period.

Timing circuit 127, as shown in FIG. 7, consists of an astable or free running multivibrator 133, for example an LM 555 timer connected in the manner shown. As in flasher circuit 126, capacitor 134 charges through variable resistor 135 and resistor 136 and discharges through variable resistor 135. The duty cycle is adjustable by varying variable resistor 135. Timing circuit 127 also includes a counter 137, for example a 4020 counter, which serves to count pulses generated by astable multivibrator 133 until a predetermined number of pulses is reached. At that point, counter 137 generates an output reset pulse to bistable multivibrator 125. Resetting multivibrator 125 turns off transistor 122 thus shutting off power to light emitting device 13. As shown in FIG. 7, timer 137 counts $2^{14}$ pulses before generating a reset signal to multivibrator 125. Because the pulse rate of multivibrator 133 is adjustable by varying resistor 135, the length of operation is determined by variable resistor 135. Multivibrator 125 starts the timing action of timing circuit 127 by outputting a signal $\overline{Q}_4$ upon being triggered by trigger 124. That signal serves to reset timing circuit 127.

FIG. 8 illustrates a suitable trigger 124 for multivibrator 125. A suitable photocell 138, for example a CdS photoresistor is used in a voltage divider circuit with variable resistor 139. Such triggering circuit would have particular application in the case of an outdoor advertising sign. As the ambient light drops in the evening, the resistance of photoresistor 138 would increase until the voltage drop across photoresistor 138 is sufficient to trigger multivibrator 125. As the ambient light increases due to the sun rising in the morning, the resistance of photoresistor 138 decreases. Because multivibrator 125 must be triggered by a rising voltage as opposed to a falling voltage, trigger 124 can no longer serve to trigger multivibrator 125.

FIG. 9 illustrates another possible trigger circuit 124'. A conventional digital alarm clock may be used to trigger multivibrator 125 by connecting the alarm output of such clock to multivibrator 125. At the set alarm time, the alarm output would serve to trigger multivibrator 125. As multivibrator 125 is triggered, signal $Q_4$ rises and may be used to automatically reset the clock alarm, as shown in FIG. 7 at 141.

Although the invention has been described for use in an outdoor advertising, many other applications are possible. For example, standard indoor lighting may be accomplished through use of the system.

Although the invention has been described in conjunction with the foregoing specific embodiment, many alternatives, variations and modifications will be apparent to those of ordinary skill in the art. Those alternatives, variations and modifications are intended to fall within the spirit and scope of the appended claims.

I claim:

1. A solar powered lighting system comprising:
   a plurality of photoemitting semiconductor means for emitting visible light upon application of a potential;
   a rechargeable power supply means operably connected to said photoemitting semiconductor means for applying a potential to said photoemitting semiconductor means;
   solar powered means operably connected to said power supply means and said solar powered means operate at approximately same potential.

2. A solar powered lighting system as in claim 1 wherein:
   said plurality of photoemitting semiconductor means comprises a plurality of serially connected light emitting diodes.

3. A solar powered lighting system as in claim 1 further comprising:
   means to mount a plurality of said photoemitting semiconductor devices in a plurality of electrically connected parallel banks, each bank containing a plurality of serially connected photoemitting devices.

4. A solar powered lighting system as in claim 3 wherein:
   said mounting means comprises a printed circuit board having a plurality of conductive paths formed on one side thereof and means for mounting said photoemitting means on the other side thereof; and, having a plurality of through holes allowing electrical connections to be made from said conductive paths to said photoemitting means.

5. A solar powered lighting system as in claim 4 wherein:
   said photo-emitting means are mounted on said printed circuit board in longitudinally extending parallel disposed banks, each bank containing a plurality of electrically serially connected photoemitting means; and
   means for electrically connecting said banks in parallel such that each bank may be separated from the remaining banks by breaking the printed circuit boards longitudinally between the banks.

6. A solar powered lighting system for an advertising sign comprising:
   a plurality of photoemitting semiconductor means for emitting visible light upon application of a potential;
   a rechargeable power supply means operably connected to said photoemitting means for applying a potential to said photoemitting means;
   solar powered means operably connected to said power supply means for recharging said power supply wherein said photoemitting means, said power supply means and said solar powered means operate at approximately same potential; and,
   means for mounting said plurality of photoemitting semiconductor means in the form of alphabetic and numeric characters.

7. A solar powered lighting system for an advertising sign as in claim 6 wherein said means for mounting comprises:
   a first member formed in the shape of an alphanumeric character;
   a second member circumscribing that first member at the periphery thereof and extending perpendicularly thereto thereby forming an alpha-numeric character of U-shaped cross-section; and, means for mounting said photoemitting means on said first member.

8. A solar powered lighting system for an advertising sign as in claim 6 wherein said means for mounting comprises:
an alpha-numeric character having a concave surface and means for securing said photo-emitting means at the base of said concave surface.

* * * * *

US004384317B1

REEXAMINATION CERTIFICATE (3809th)

United States Patent [19]

Stackpole

[11] B1 4,384,317

[45] Certificate Issued Jul. 13, 1999

[54] SOLAR POWERED LIGHTING SYSTEM

[75] Inventor: Edward J. Stackpole, San Antonio, Tex.

[73] Assignee: Flex-O-Lite, Inc., St. Louis, Mo.

Reexamination Request:
No. 90/004,318, Jul. 30, 1996

Reexamination Certificate for:
Patent No.: 4,384,317
Issued: May 17, 1983
Appl. No.: 06/090,322
Filed: Nov. 1, 1979

[51] Int. Cl.⁶ .................................................. F21L 7/00
[52] U.S. Cl. .......................... 362/183; 362/184; 362/234;
362/249; 362/276; 362/295; 362/800; 362/802;
362/812; 136/291; 136/293
[58] Field of Search ...................................... 362/183, 184,
362/234, 249, 252, 276, 295, 800, 802,
812; 40/550

[56] References Cited

U.S. PATENT DOCUMENTS

| | | | |
|---|---|---|---|
| 3,313,939 | 4/1967 | Spencer | 250/212 |
| 3,448,575 | 6/1969 | Grohoski | 58/23 |
| 3,757,511 | 9/1973 | Burgess et al. | 58/50 R |
| 3,921,049 | 11/1975 | Mellors et al. | 320/2 |
| 3,979,656 | 9/1976 | Takeda et al. | 320/2 |
| 4,006,583 | 2/1977 | Vuilleumier | 58/23 C |
| 4,009,535 | 3/1977 | Stock | 40/130 K |
| 4,017,725 | 4/1977 | Roen | 235/152 |
| 4,050,834 | 9/1977 | Lee | 404/16 |
| 4,095,217 | 6/1978 | Tani et al. | 340/324 R |
| 4,164,698 | 8/1979 | Kleeberg | 320/2 |
| 4,200,904 | 4/1980 | Doan | 362/183 |
| 4,209,346 | 6/1980 | King | 136/89 PC |
| 4,240,021 | 12/1980 | Kashima et al. | 320/2 |
| 4,243,928 | 1/1981 | Nazimek | 320/2 |
| 4,266,178 | 5/1981 | Asakawa | 320/39 |
| 4,281,369 | 7/1981 | Batte | 362/183 |
| 4,314,198 | 2/1982 | Rogers | 323/351 |

OTHER PUBLICATIONS

Application Note 931, Solid State Alphanumeric Display Decoder/Driver Circuitry, Hewlett Packard, pp. 1–13, published Nov. 1970.

*Primary Examiner*—Stephen F. Husar

[57] ABSTRACT

A solar powered lighting system including a light emitting unit electrically connected to a rechargeable power storage unit, a solar powered recharger connected to that power storage unit, means to prevent discharge of that power storage unit through the solar powered recharger, means to prevent overcharging of the power storage unit, means to prevent discharging the power storage unit below a predetermined level and means to automatically connect the disconnect the light emitting unit from the power storage unit wherein the voltage output of the solar powered recharger and the power storage unit is matched to the voltage required by the light emitting unit.

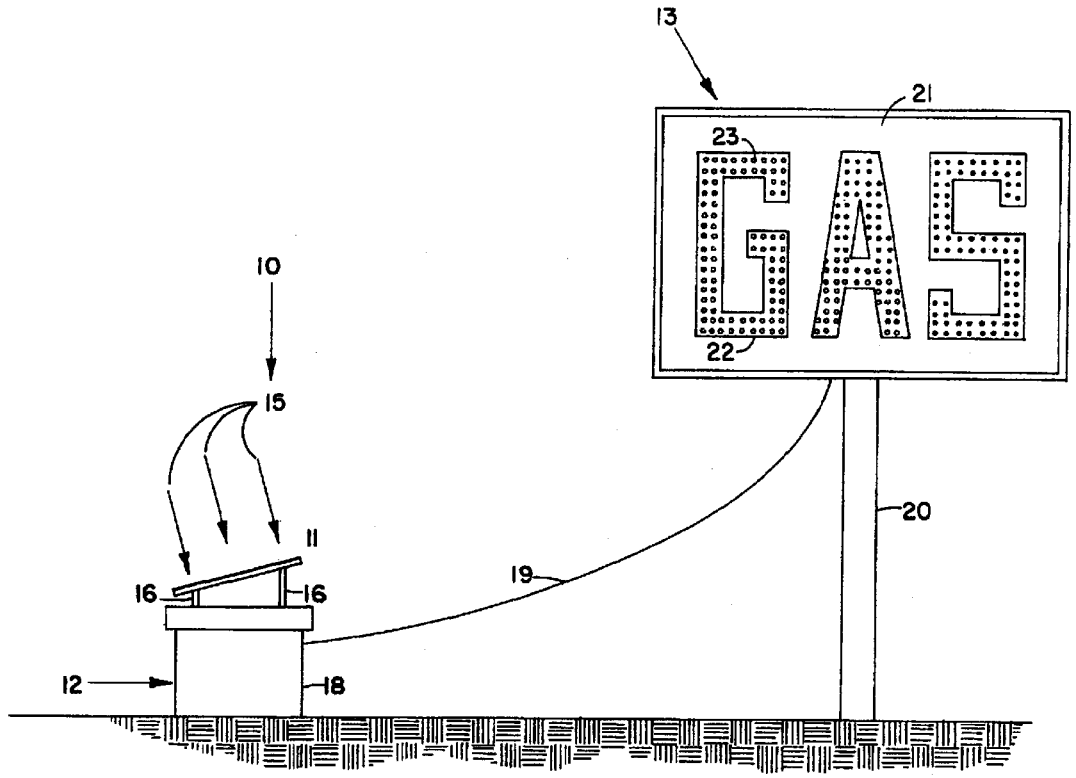

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7 and 8 is confirmed.

Claims 1–6 are cancelled.

* * * * *